US005783029A

United States Patent [19]

Stettner et al.

[11] Patent Number: 5,783,029

[45] Date of Patent: Jul. 21, 1998

[54] PAPER WEB LEADING EDGE PREPARATION DEVICE

[75] Inventors: Gerd Erich Stettner, Stadtlauringen; Hartwig Horst Trutschel, Würzburg, both of Germany

[73] Assignee: Koenig & Bauer-Albert Aktiengesellschaft, Wurzburg, Germany

[21] Appl. No.: 622,136

[22] Filed: Mar. 27, 1996

[30] Foreign Application Priority Data

Nov. 2, 1995 [DE] Germany .......................... 195 40 689.3

[51] Int. Cl.$^6$ .......................... B32B 31/00; B65H 19/18

[52] U.S. Cl. .......................... 156/510; 156/504; 156/502; 242/553; 242/554.2; 242/555.3; 242/556; 242/580; 242/583

[58] Field of Search .......................... 156/256, 267, 156/504, 505, 506, 510; 242/555.3, 553, 554.2; 83/492, 549

[56] References Cited

U.S. PATENT DOCUMENTS

| | | | |
|---|---|---|---|
| 1,642,998 | 9/1927 | Mason | 83/492 |
| 4,543,152 | 9/1985 | Nozaka | 156/510 |
| 4,685,392 | 8/1987 | Watanabe | 101/226 |
| 4,802,632 | 2/1989 | Fukuda et al. | 242/553 |

FOREIGN PATENT DOCUMENTS

| | | | |
|---|---|---|---|
| 0 129 238 | 12/1984 | European Pat. Off. | 242/553 |
| 39 18 552 | 12/1990 | Germany | 242/553 |
| 62-88759 | 4/1987 | Japan | 242/553 |
| 4-17094 | 2/1992 | Japan | 242/553 |
| 07-124892 | 5/1995 | Japan | 242/553 |
| 9602451 | 2/1996 | WIPO | 242/553 |

OTHER PUBLICATIONS

Koenig & Bauer–Albert AG Brochure; "KBA Easy Splice"; May 1995 Drupa Exhibition.

*Primary Examiner*—David A. Simmons
*Assistant Examiner*—Linda L. Gray
*Attorney, Agent, or Firm*—Jones, Tuller & Cooper, P.C.

[57] ABSTRACT

A leading edge of a paper web supply roll is prepared for utilization in a flying web splice. The paper web supply roll is supported adjacent a work carriage that is movable transversely across the face of the supply roll. As the work carriage moves across the web, a leading edge of the web is cut, spaced adhesive labels and a double sided adhesive splice tape are applied, and the lateral edges of the web adjacent the web leading edge are provided with angled lateral edge cuts.

7 Claims, 6 Drawing Sheets

121

PAPER WEB LEADING EDGE PREPARATION DEVICE

FIELD OF THE INVENTION

The present invention is directed generally to a paper web leading edge preparation device. More particularly, the present invention is directed to a device for preparing the leading edge of a paper web supply roll. Most specifically, the present invention is directed to a device for preparing the leading edge of a paper web supply roll for a web splice in a rotary printing machine. The leading end of the paper supply web is unrolled from the supply roll and is clamped in place. A work carriage is moved across the face of the paper web supply roll in a direction generally parallel to the axis of rotation of the supply roll. The work carriage includes lateral edge cutters, a leading edge cutter, paper web label appliers, and a double sided adhesive tape applier. The paper web leading edge is fully prepared for a flying web splice during a single passage of the work carriage across the face of the web.

DESCRIPTION OF THE PRIOR ART

In the field of rotary web-fed printing, so-called flying web splices are typically used to attach a leading end of a fresh paper web from a full paper web supply roll to a traveling paper web from a soon to be depleted paper web supply roll. The paper web splice is carried out at the normal speed of travel of the paper web through the press so that no interruption in the operation of the printing press is required. The fresh paper web supply roll is typically prepared for such a flying web splice at a location remote from the location where the splice is actually accomplished. Once the fresh web has had its leading edge properly prepared or processed, it is placed onto a suitable roll stand where it is rotatably supported and where it can be brought up to the proper rotational speed to accomplish the flying web splice.

At the preparation location, several different steps should preferably be carried out to properly prepare the paper web leading edge for a flying web splice. These include the preparation of a straight cut leading edge, the placement of suitable paper web labels in spaced locations along the leading edge, and the securement of a double sided adhesive splice tape on the leading edge of the web. In the prior art, all of these various steps have required separate operations or manual preparation.

In the European Patent Publication No. EP 0 129 238 Al there is disclosed a paper web supply roll in which the paper web has a cut leading edge that extends across the full width of the paper web in a direction generally parallel to the axis of rotation of the paper web supply roll. One disadvantage of providing the leading edge of the paper supply roll with this type of cut edge is that in the course of a flying paper web splice, it is possible that the freshly prepared leading edge can be laterally offset slightly with respect to the depleting paper web. Such a lateral offset of the new web with respect to the end to be cut off from the exhausting supply roll can leave a portion of the double sided adhesive tape used in the web splice exposed. The danger of this misalignment is that it may cause the paper web to become wound up on one of the printing press rolls or cylinders. Such a paper web wind-up may result in damage to the affected roll or cylinder and will clearly require a stoppage of the press operation to remove the wound-up web and to effect a proper web splice.

It will thus be seen that a need exists for a device for processing the leading edge portion of a paper web unrolled from a paper web supply roll which overcomes the limitations of the prior art. The paper web leading edge preparation device in accordance with the present invention provides such a device and is a significant advance in the art.

SUMMARY OF THE INVENTION

It is an object of the present invention to provide a paper web leading edge preparation device.

Another object of the present invention is to provide a device for preparing the leading edge of a paper web supply roll.

A further object of the present invention is to provide a device for preparing the leading edge of a paper web supply roll for a web splice in a rotary printing press.

Yet another object of the present invention is to provide a paper web leading edge preparation device which will cut off lateral corners of the start of a paper web supply roll which is pre-formed crosswise with respect to the running direction of the paper web.

Still a further object of the present invention is to provide a paper web leading edge processing device which will operate to accomplish several preparation steps.

As will be discussed in detail in the description of the preferred embodiment which is presented subsequently, the paper web leading edge preparation device in accordance with the present invention is usable to prepare the leading edge of a paper web wound on a paper web supply roll for the accomplishment of a flying web splice. The paper web supply roll is supported for rotation between spaced lateral frame members of, for example, a roll changer. A work carriage is supported by a work carriage frame and is movable laterally across the face of the paper web supply roll in a direction generally parallel to the axis of rotation of the supply roll. The work carriage carries a transverse cutting device, an adhesive label dispenser, an adhesive strip application device, and a web corner cutting device. The transverse cutting device cuts the leading edge in a straight line parallel to the axis of rotation of the paper web supply roll. The corner cutting device cuts the lateral edges of the leading end of the supply roll to form a somewhat tapered leading end of the paper web. The adhesive label dispenser applies spaced labels to the paper web. The adhesive strip application device applies a strip of double sided adhesive splice tape to the leading end of the paper web on the paper web supply roll. All of these steps are accomplished during a single pass of the work carriage across the width of the paper web supply roll.

It is a particular advantage of the present invention that, during the single passage of the work carriage across the face of the paper web supply roll in a continuous manner, all of the necessary steps in the preparation or processing of the paper web leading edge can be accomplished. It is particularly advantageous that during this passage of the work carriage in a direction parallel to the axis of rotation of the supply roll that the two lateral end corners of the supply roll can be cut off. The corner cuts are made in a direction which is more aligned with the direction of web travel and result in the removal of two generally triangular segments from the two spaced lateral or side edges of the leading end of the paper web. These removed corners render the leading end of the fresh paper web somewhat tapered or trapezoidal in shape. This shape facilitates the accomplishment of a flying web splice with a greatly reduced likelihood of a paper web wind up.

The work carriage will accomplish all of the web leading edge preparation steps in one passage across the face of the paper web supply roll. This greatly reduces the amount of time required to accomplish the leading edge preparation. The preparation device in accordance with the present invention requires little space in which to operate. This means that the device for accomplishing the cutting off of the web leading edge corners can be incorporated into the work carriage together with the transverse cutting device, the adhesive label dispenser, the adhesive strip applicator, and, if desired, a second adhesive label dispenser. The work carriage can be either shifted manually or can be driven across the width of the paper web supply roll in a direction generally parallel to the axis of rotation of the paper web supply roll. If appropriate, the paper web leading edge preparation device can be attached to the cylinder changer of any web-fed rotary printing press.

The paper web leading edge preparation device in accordance with the present invention overcomes the limitations of the prior art. It is a substantial advance in the art.

BRIEF DESCRIPTION OF THE DRAWINGS

While the novel features of the paper web leading edge preparation device in accordance with the present invention are set forth with particularity in the appended claims, a full and complete understanding of the invention may be had by referring to the detailed description of the preferred embodiment which is presented subsequently, and as illustrated in the accompanying drawings, in which:

DETAILED DESCRIPTION OF THE PREFERRED EMBODIMENT

Figure 1:
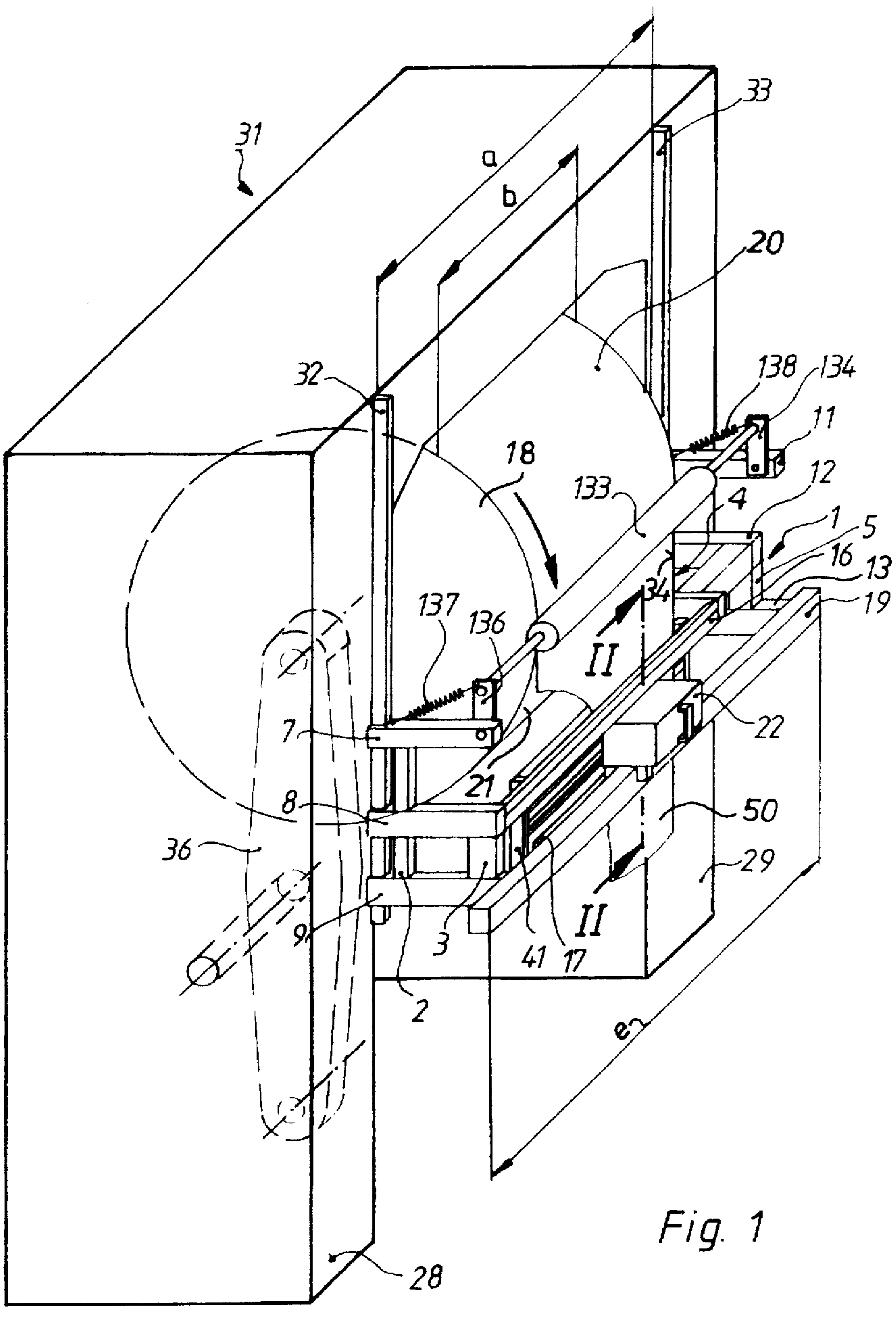
FIG. 1 is a schematic perspective view of a device for preparing the leading edge of a paper web supply roll and showing the device disposed on the lateral frames of a cylinder changer.

Referring initially to FIG. 1, there may be seen a preferred embodiment of a paper web leading edge preparation device in accordance with the present invention. This device is intended for use in the preparation of a leading edge of a paper web taken from a paper web supply roll so that it can be utilized in the performance of a so-called flying web splice in a web-fed rotary printing press. Since the press itself, as well as the paper web reel stand on which the prepared paper supply web will be placed for use in the flying web splice form no part of the present invention, they will not be discussed in detail. It will be understood that they are generally well known in the art.

A work carriage frame, identified by 1 as a whole, consists of two spaced pairs of perpendicularly arranged supports 2 and 3, and 4 and 5. These supports are respectively connected with each other in pairs by struts 7, 8, 9; and 11, 12, 13. The pairs of supports 2 and 3, and 4 and 5 are disposed at a distance "a" from each other with distance "a" corresponding at least to a width "b" of a paper web supply roll 18. These pairs of supports are connected with each other by means of work carriage cross bars 16, 17. A guide rail 19 of a length "e" is disposed parallel with the lower work carriage cross bar 17 to receive a work carriage 22, which is displaceable in an axis-parallel direction with the paper web supply roll 18. The length "e" of the work carriage guide rail 19 is of such a size that the work carriage 22 can move on the guide rail 19 on both sides beyond the width "b" of the paper web supply roll 18 to be treated. As may be seen in FIG. 2, the guide rail 19 has guides 23 and 24 on both vertical sides, with which spaced guide wheels 26 and 27 of the work carriage 22 are frictionally and interlockingly connected. It is possible to move the work carriage frame 1, for example in the vertical direction, as the main carriage up and down on the front faces of a lateral frame 28 and 29 of a roll changer 31, as seen in FIG. 1. This can be performed manually, for example, by means of providing cable pulls and reversing rollers disposed on the roll changer 31 and counterweights, not shown, for counter-balancing the weight of the main carriage displaceable in the vertical direction, or by means of a drive, for example a motor-driven pinion and toothed rack. The supports 2 to 5, struts 7 to 9 and 11 to 13, cross bars 16 and 17, and the guide rails 19, 32, 33 can be made of a known profiled material. It will be understood that support 4 is not shown in FIG. 1 but is positioned with respect to support 5 as support 2 is to support 3.

It would also be possible to dispose the frame 1 separately on a carriage, not shown, with a lifting mechanism for lifting the frame 1, instead of on a roll changer 31, wherein the carriage can be disposed to be movable on rails (see DE 39 18 552 A1, FIG. 1). Because of its mobility, it is possible in this way to access several roll changers with one paper web leading edge preparation device in order to prepare the start of the paper webs of paper web supply rolls 18 disposed in support arms 36 for a flying roll change. As a further variation, it is possible to dispose the frame 1 in fixed side frames, for example, and to equip the side frames with pivot arms for receiving and rotatably seating the paper web supply roll 18. In this case known conveying devices for bringing and taking away the paper web supply rolls 18 would then be provided.

Figure 2:
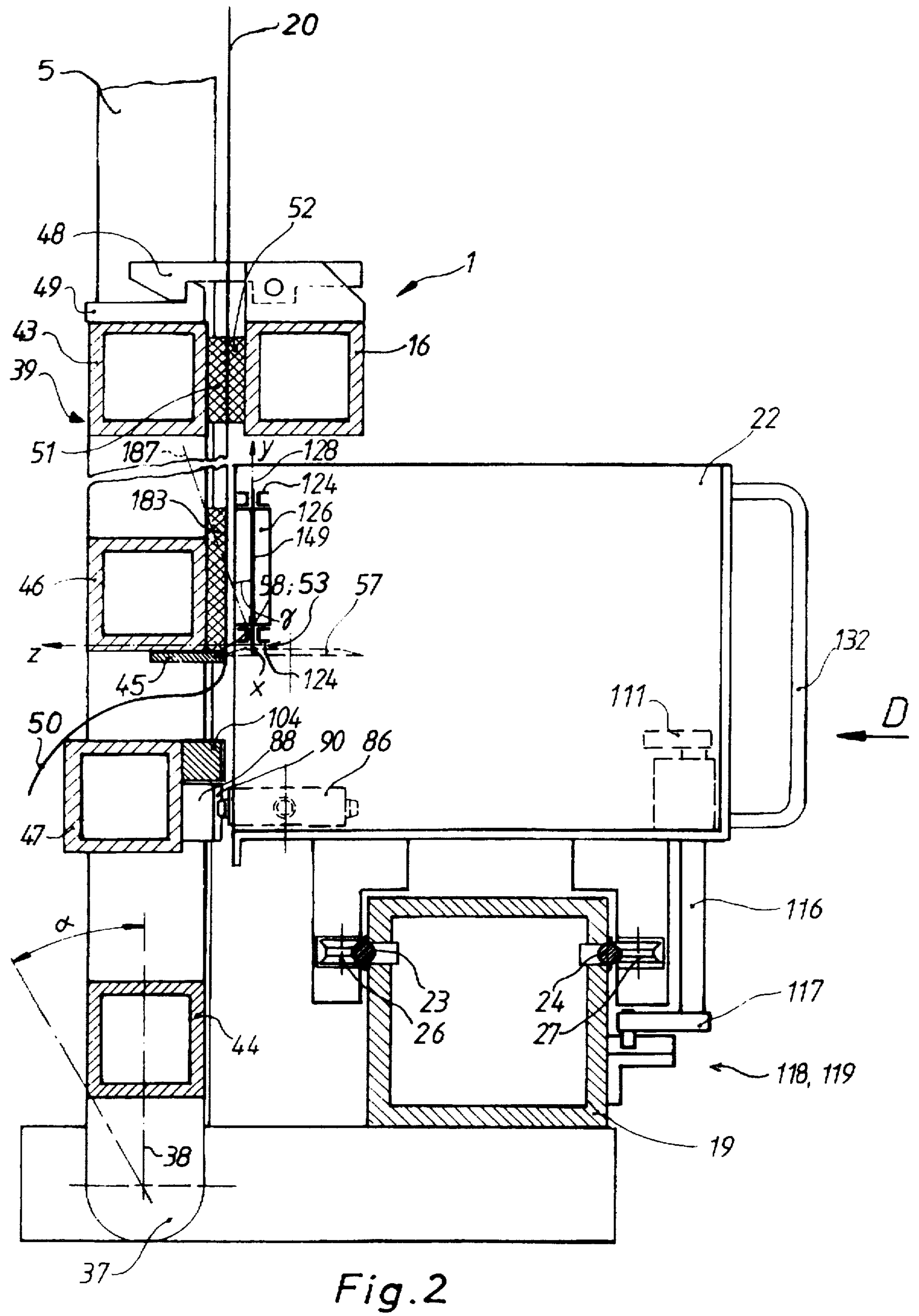
FIG. 2 is a cross-sectional view of the device, taken along line II—II of FIG. 1, and showing a rotatable cutter disposed on a work carriage but with the drive not shown.
Figure 3:
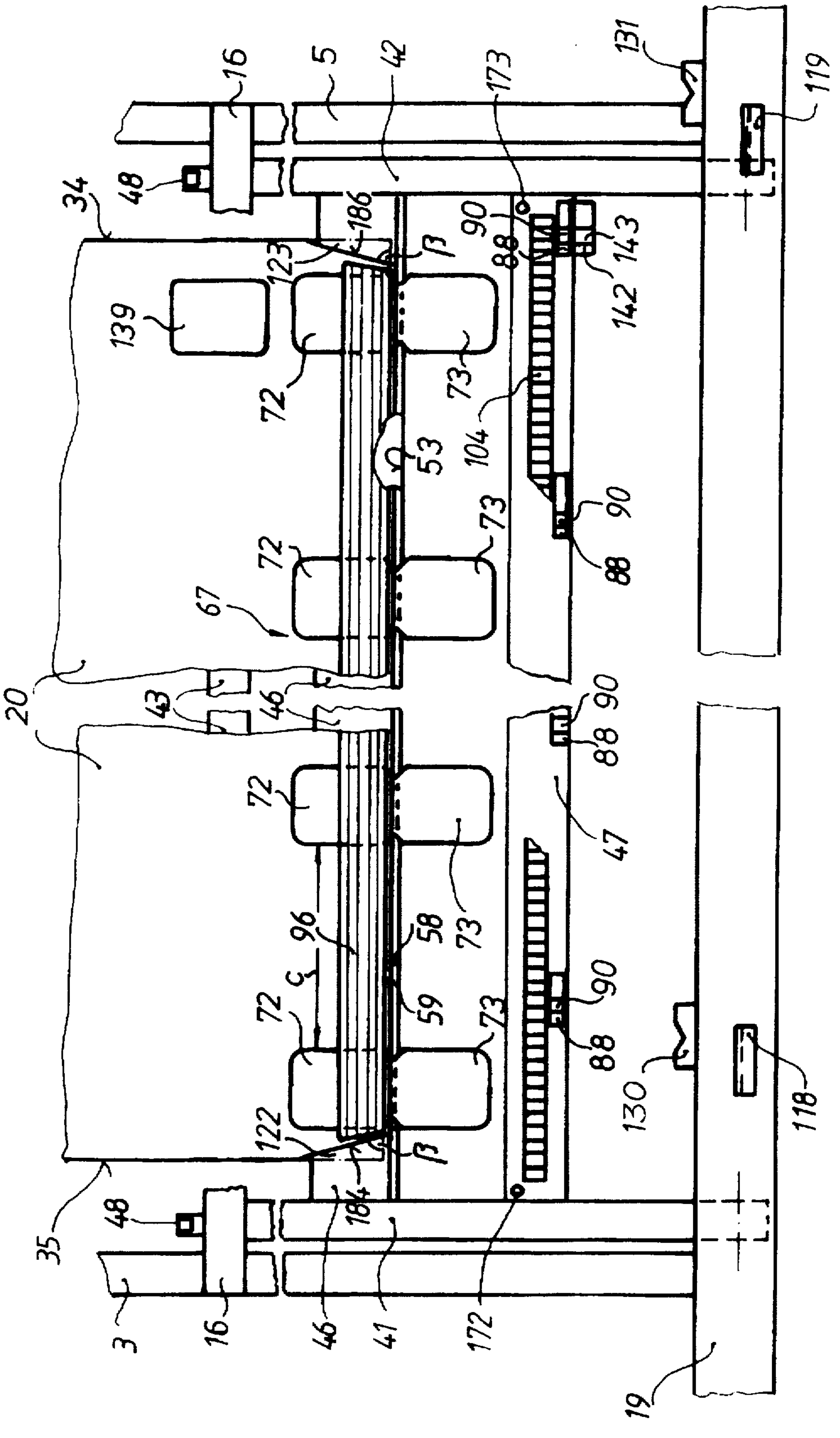
FIG. 3 is a front elevation view taken in the direction indicated by the arrow D in FIG. 2 and with the work carriage removed.

A pivot frame 39, which is pivotable over an angle $\alpha$ with respect to a perpendicular line 38 may be seen in FIG. 2. Pivot frame 39 is disposed by means of a hinge 37 at the lower work carriage cross bar 17 and extends in an axis-parallel direction with the paper web supply roll 18. The pivot frame 39 has two lateral supports 41 and 42, as seen in FIG. 3, which, in the working state, extend perpendicularly and are connected with each other by means of upper and lower cross bars 43 and 44 respectively, as shown in FIG. 2. The pivot frame 39, in addition, has a cutter cross bar 46 and a drive cross bar 47 between the upper and the lower cross bars 43 and 44 and parallel with the upper and lower cross bars 43 and 44. These cutter and drive cross bars 46 and 47 will be described in more detail below. The pivotable frame 39 can be locked in its perpendicular working position, by means of, for example, one or a plurality of pivotable latch bars 48 arranged outside of the width "b" of the paper web supply roll 18 on the traverse upper work carriage cross bar 16 of the frame 1. The latch bar or latch bars 48 extend with a protrusion behind one or a plurality of stop elbows 49 which are disposed on the upper cross bar 43, as seen in FIG. 2. Rubber strips 51 and 52, or strips of a similar elastic material, are respectively disposed between the upper cross bar 43 of the pivotable frame 39 and the upper cross bar 16 of the work carriage frame 1 for clamping the start 50 of a paper web 20 rolled off the paper web supply roll 18. In this way the pivotable frame 39, together with the cross bar 16, is also used as a holding device for the start 50 of a paper web 20.

Figure 4:
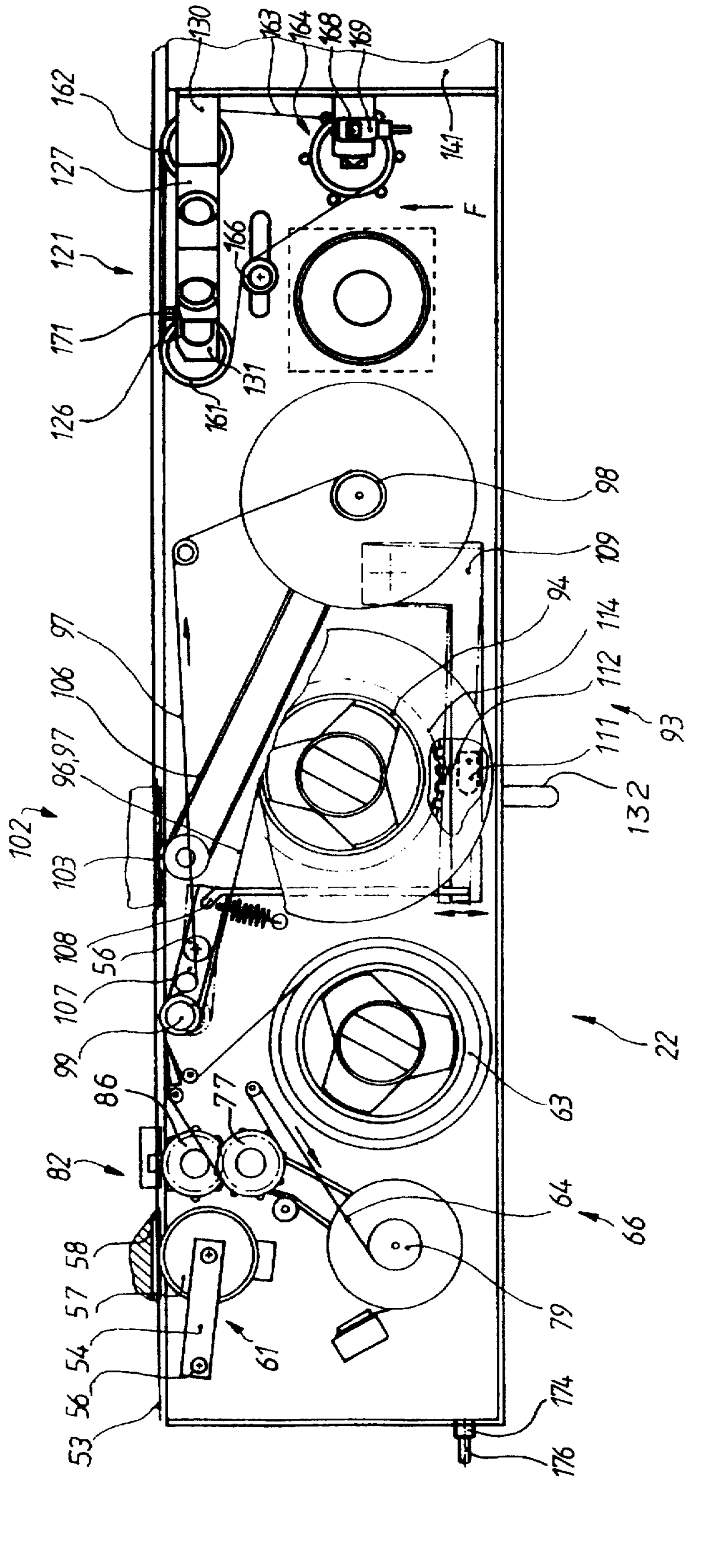
FIG. 4 is a top plan view of the work carriage with a top cover of the carriage removed.

A circular cutter 57, as seen in FIGS. 2 and 4 and which can be applied by means of the force of a spring, not shown, is disposed for pivotal movement about a pivot shaft 56 that is fixed on the work carriage 22 on a lever arm 54. This cutter 57 is intended for use with a transverse cutting device identified as a whole by 61 and as seen most clearly in FIG. 4. When the work carriage 22 is displaced on the guide rail 19, the cutter 57 engages a horizontally extending counter cutting bar 45 with a cutting groove 58, held in the cutter cross bar 46 of the frame 39, as shown in FIG. 2, and in the process transversely cuts the start 50 of the paper web, so that the cut start or cut leading edge 53 of the paper web extends in an axis-parallel direction.

In an alternate configuration which is not specifically shown, a transverse cutter device, not shown, can also be constituted by disposing, in place of a cutting groove 58 in the cutter cross bar 46, a cutter strip fixed in place and extending over the entire width "b" of the paper web roll 18, on whose cut edge the start 50 of the paper web is pressed, for example by means of a pressure roller of great hardness, and which may consist of a plastic material or of another similar material.

Figure 6:
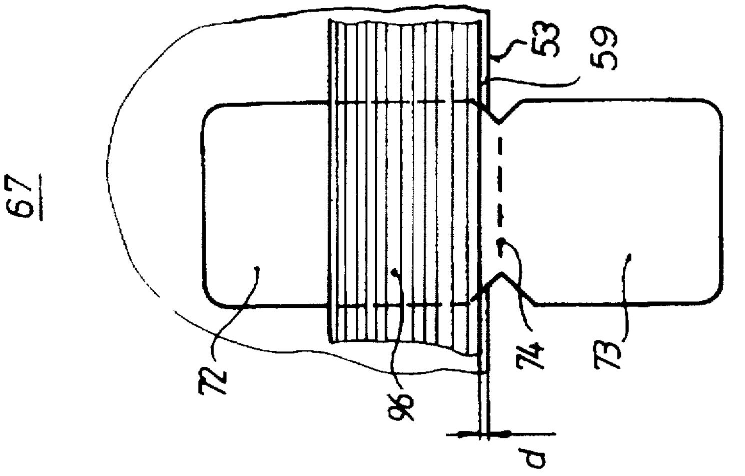
FIG. 6 is a depiction of an adhesive label dispensed by the adhesive label dispenser.
Figure 5:
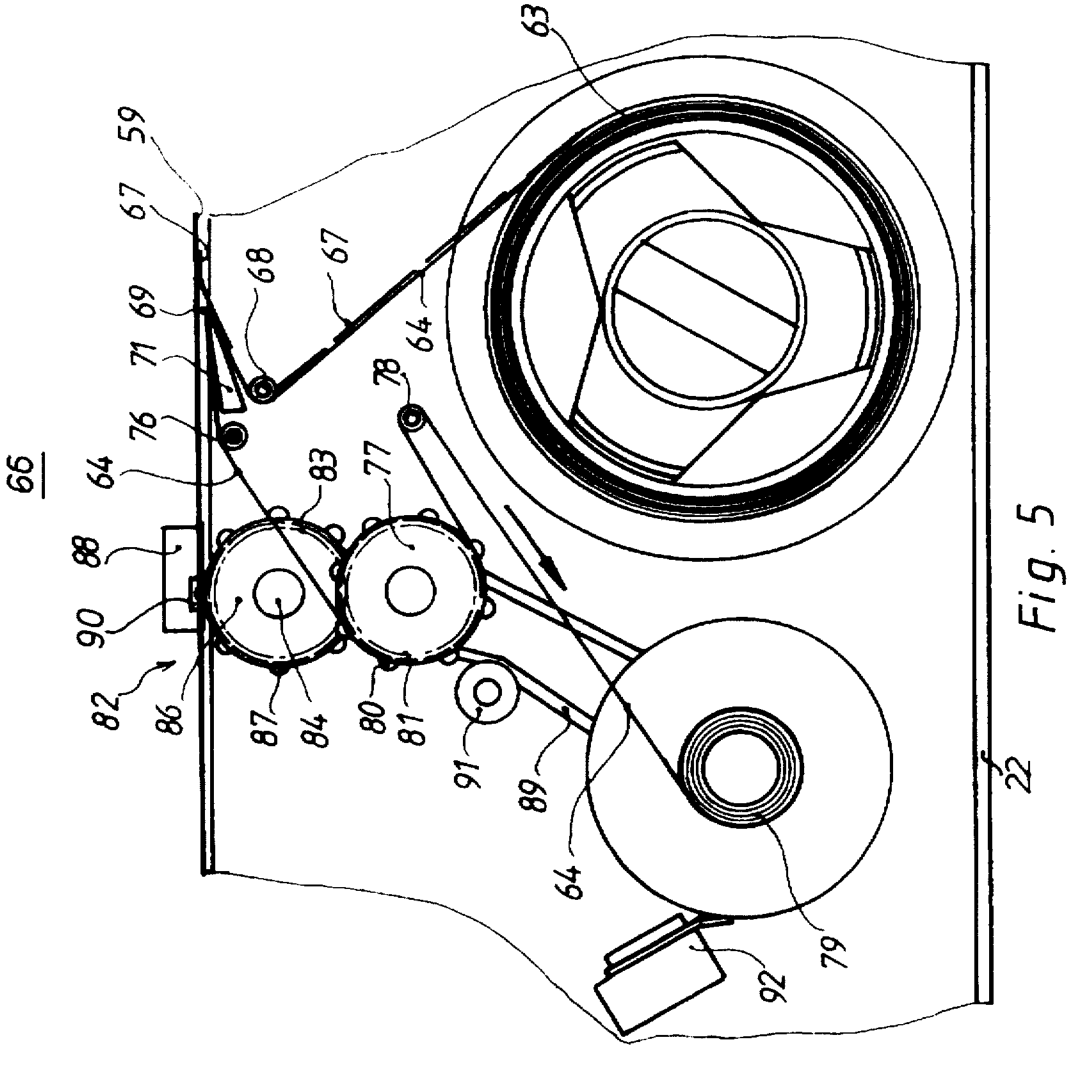
FIG. 5 is an enlarged top plan view of a portion of the work carriage shown in FIG. 4 and showing the adhesive label dispenser in detail.

An adhesive label dispenser, which is identified as a whole by 66 and which is shown most clearly in FIGS. 4 and 5, is disposed on the work carriage 22 to receive a supply roll 63 of a carrier tape 64 carrying adhesive labels 67 which are adhesive on one side. The carrier tape 64 provided with the adhesive labels 67 is guided over a guide roller 68 and then past a removal edge 69 of a tape guide 71 extending at an acute angle and located in the immediate vicinity of the start 53 of the paper web. In the process, an adhesive label 67 is brought into contact with the cut start edge 53 of the paper web 20 in such a way that an adhesive surface of a first or upper half 72 of the adhesive label 67, as seen in FIGS. 3 and 6, adheres to the cut area of the start edge 53 of the paper web 20, while a second or lower half 73 of the ready-to-apply adhesive label 67 projects past the cut start edge 53 of the paper web and is secured to the second layer 21 of the paper web on the paper web supply roll. A perforated predetermined tear line 74 has been provided between the upper half 72 and the lower half 73 of the adhesive label 67. The carrier tape 64, now absent the adhesive labels 67, continues to be guided by guide rollers 76 and 78, and by a drawing roller 77 to a winding roller 79 for the carrier tape 64. The carrier tape 64 has conveying holes along its lateral edges, and these are engaged by driving pins 80 located on both edges of the circumference of the drawing roller 77. On one of its edges, the drawing roller 77 is furthermore provided with a gear wheel 81 which meshes with a gear wheel 83 of a driving unit that is identified as a whole by 82. The driving unit 82 consists of the gear wheel 83, seated fixed in place on the work carriage 22, and on whose shaft 84 a driving wheel 86 is interlockingly disposed. Driving wheel 86 has a number of pins 87 on its circumference, which mesh with drivers 88 fixedly disposed on the drive cross bar 47 of the pivotable frame 39 when the work carriage 22 is moved, again as shown in FIGS. 3 and 5. The drivers 88 have a distance from each other which is equal to that of the spacing of the adhesive labels 67 of the paper web and can each have a perpendicular groove 90 in the center which is engaged by a pin 87 of the driving wheel 86. The gear wheel 83 of the driver unit 82 meshes with the gear wheel 81 of the drawing roller 77. A circular belt 89 is seated on pulleys and rotates between the drawing roller 77 and the winding roller 79 and in turn drives the winding roller 79. The circular belt 89 can be tensioned by means of a tensioning roller 91. The winding roller 79 can be provided with a resilient back stop 92 acting on the lateral disks of the winding roller 79.

In an alternate embodiment for driving the adhesive label dispenser 66, it is also possible to provide the winding roller 79 for the carrier tape 64 with an electrical drive, not shown, for example an electric motor, in place of the drawing roller 77, the driving wheel 86 and the circular belt drive 89. The motor may be switched on by means of a signal transmitter, not shown, disposed on the work carriage 22, for example, a limit switch, for applying an adhesive label 67. After an adhesive label 67 has been applied to the paper web 20, it is possible to scan the carrier tape 64 carrying the adhesive labels 67 ahead of the removal edge 69 of the tape guidance 71, viewed in its direction of running, by means of a photoelectric barrier or a microswitch disposed on a predetermined place on the work carriage 22 for switching off the drive of the winding roller 79 when a fresh adhesive label 67 appears. The drive of the winding roller 79 is turned on again when the signal transmitter fixed in place on the work carriage, which may be, for example a limit switch, comes into contact with a further triggering element fixed in place on the drive cross bar, for example a control cam, not shown.

An adhesive strip dispenser or an adhesive strip application device, identified by 93 as a whole, and shown most clearly in FIG. 4 is also located on the work carriage 22. The adhesive strip dispenser 93 has both an adhesive tape supply roll 94, seated fixed in place on the carriage, for the dispensing of a double-sided adhesive tape 96 disposed on a carrier tape 97, and a winding roller 98, seated fixed in place on the work carriage 22, for take up of the carrier tape 97. Application of the adhesive tape 96 takes place by means of a spring-loaded pressure roller 99 which pushes the adhesive tape 96 against the cut start edge 53 of the paper web 20 and the latter against the cutter cross bar 46. During the movement of the work carriage 22, the adhesive tape 96 is automatically pulled off the adhesive tape supply roll 94, which can be embodied to be braked, because of its adhesion on the cut start edge 53 of the paper web 20, while the carrier tape 97 is wound up by means of a drive, identified as a whole by 102 and acting on the winding roller 98. The drive 102 for the winding roller 98 consists of a gear wheel 103 which is seated, fixed in place, on the work carriage, and which engages a toothed rack 104 disposed, fixed in place, on the drive cross bar 47 of the pivotable frame 39. A circular belt 106, running between the shaft of the gear wheel 103 and the shaft of the winding roller 98, over pulleys, provides the connection between the drive 102 and the winding roller 98 for the carrier tape 97.

The pressure roller 99 for the adhesive tape 96 is located on a first end of a two-armed lever 107, that is seated fixed in place on the work carriage 22, and whose second end carries a coupler 108 which is connected with the first end of an angle lever 109, whose second end is pivotably seated fixed in place on the work carriage 22. This two-armed lever mechanism 107, 108 and 109 can be actuated by means of a cam 111 acting approximately on the center of the angle lever 109, as shown in FIGS. 2 and 4. In this way, the pressure roller 99 can be placed against and away from the paper web 20. The rotating movement of the adhesive tape supply roll 94 is simultaneously stopped by means of the pressure roller 99 when the lever 107 pivots away, in that a locking pin 112 located in the vicinity of the cam 111 on the angle lever 109 enters a tooth gap in a gear wheel 114 which is fixedly connected with the shaft of the adhesive tape roll 94 as seen in FIG. 4.

The actuation of the cam 111 takes place via a perpendicularly arranged shaft 116, on whose second, lower end a lever 117 is disposed, and which extends at right angles with the shaft 116, as is shown in FIG. 2. The lever 117 engages respectively one of two control cams 118 and 119, which are arranged on the side of the work carriage guide rail 19 as seen in FIG. 3, by means of a pin in order to engage or disengage the lever 107 with the pressure roller 99 for the adhesive tape 96. If the lever 107 is switched off after the movement of the work carriage 22 has taken place, the adhesive tape 96 is automatically torn off. The adhesive tape supply roller 94 can also be placed on a driven roll carrier.

Figure 7:
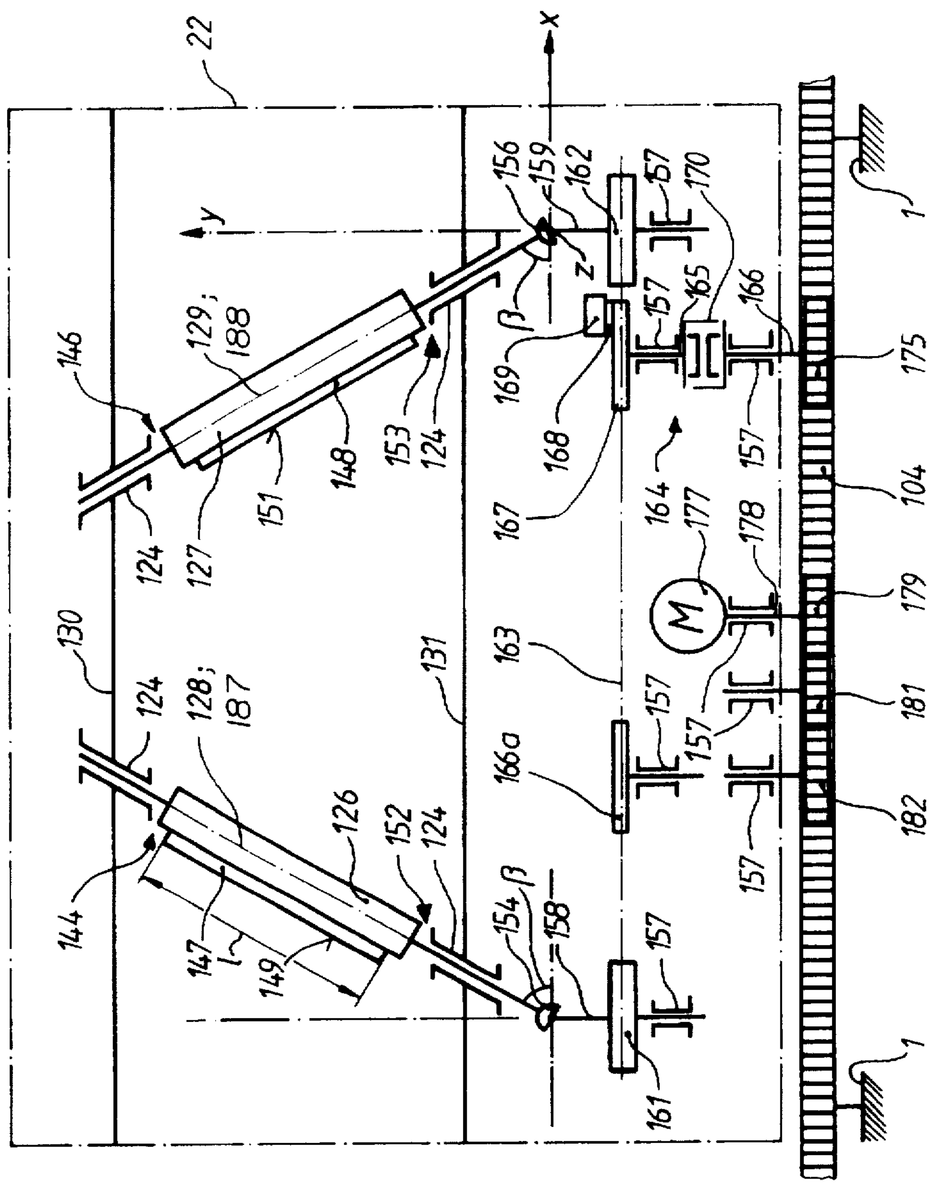
FIG. 7 is a schematic front elevation view of a corner cutting device in accordance with the present invention and taken in the direction indicated by the arrow F in FIG. 4.

A corner cutting device 121, in accordance with the present invention, is disposed either separately or together with the above mentioned devices, on the work carriage 22 and is used for cutting off corner web sections 122 and 123 which are located between the lateral edges 34, 35 and the cut start edge 53 of the paper web 20, as seen in FIG. 3. It is necessary to cut off these corner web sections 122 and 123 in order to compensate for any possibly occurring lateral overlapping of the two-sided acting adhesive tape 96 during the flying connection of the paper webs. The corner cutting device 121, as may be seen most clearly in FIG. 7, consists of a plurality, for example of two cutters 147 and 148, each of a length "l ", and which are rotatably disposed spaced at a distance from each other along an axis-parallel direction in respect to the paper web supply roll 18 in bearings 124 fixed in place on the work carriage 22. The length "l" of the cutters 147 and 148 is a fraction of the paper web width "b", for example 60mm. Each cutter 147 and 148 can be connected, for example releasably, with a rotatable, elongated cylindrical cutter support 126 or 127, respectively. A cutter 147 or 148, which respectively is in contact with a lateral edge 35 or 34 of the paper web 20, is placed obliquely in respect to the lateral edge 35, 34. This oblique positioning is provided, in a first embodiment, in such a way that the rotary shafts 128 and 129 of the elongated cylindrical cutter supports 126 and 127 extend at an acute angle $\beta$ in relation to the x-axis of an x, y-plane of a two-dimensional right-angled coordinate system as shown in FIG. 7. The angle $\beta$ can be between 10° and 80°. Cutting edges 149 and 151 of the cutters 147 and 148, fastened in the cutter supports 126 and 127, extend axis-parallel with the rotary shafts 128 and 129 of the cutter support 126 and 127. In this case the cutter 147 engages the lateral edge 34 and the cutter 148 engages the lateral edge 35 of the paper web 20.

In accordance with a second embodiment of the oblique positioning of a rotary shaft 187 or 188 of a rotatable cutter support of a cutter 147 or 148, the rotary shaft 187 or 188, as seen in FIG. 2, extends inside an extended x, y-plane at an acute angle $\beta$, such as shown in FIG. 7 for example of 10° to 80°, in respect to the x-axis of a spatially right-angled coordinate system x, y, z. In addition, the rotary shaft 187 or 188 of a rotatable cutter support extends inside an extended x, z-plane at an acute angle $\gamma$ in relation to the x-axis as shown in FIG. 2, in which rotary shaft 188 is not shown. The angle $\gamma$ is approximately 10°. In this case, the cutting edges 149 and 151 of the cutters 147 and 148 fastened in the cutter supports 126 and 127 also extend axis-parallel in respect to the rotary shaft 128 and 129 of the cutter support.

The bearings 124 are also maintained in cross bars 130, 131 fixed in place on the work carriage 22, as seen in FIGS. 2 and 7. Each lower end 152 or 153 of the rotary shaft 128 or 129 is connected through a universal joint 154 or 156 with a perpendicularly extending rotatable shaft 158 or 159 that is seated in bearings 157 fixed in place on the work carriage 22. Each one of these shafts 158 or 159 supports a toothed belt disk 161 or 162, respectively over which a toothed belt 163 runs. The toothed belt 163 is driven by means of a drive 164 and is tensioned, for example by means of a tensioning disk **166*a*. In this way, both cutter supports 126 and 127 can be driven together by means of a common drive 164. The drive 164 consists of a two-part shaft 165 and 166 which is seated in bearings 157 and which is fixed in place on the work carriage 22. The two part shaft supports, on its upper end, a pulley 167 for receiving the toothed belt 163 and, disposed on its lower end, a gear wheel 175 which is in meshing engagement with the toothed rack 104 of the drive cross bar 47 fixed in place on the frame as seen in FIGS. 2, 3 and 7. The two-part shafts 165 and 166 can be connected by means of a known electromagnetic coupling 170. On its top and in the vicinity of its circumference, the pulley 167 of the drive 164 has a triggering element, for example a pin 168, which cooperates in a contactless manner with an initiator 169 that is disposed, fixed in place, on the work carriage 22, and which may be, for example, an electrical microswitch, as shown in FIG. 4. A second initiator 171, also disposed fixed on the work carriage 22, is disposed between the corner cutting device 121 and the adhesive tape application device 93 in the immediate vicinity of the drive cross bar 47, as seen in FIG. 4. This second initiator 171 cooperates, in a contactless manner, with two pins 172 and 173 which are disposed on the drive cross bar 47, as shown in FIG. 3. Both initiators 169 and 171 are electrically connected, in a known manner, with the electromagnetic coupling 170. The work carriage 22 or its housing is provided with an inlet 174 for an electrical cable 176**, for example a so-called energy supply chain.

Actuation of the work carriage 22 in the axis-parallel direction with respect to the paper web supply roll 18 can take place either by means of a handle 132 attached to the work carriage 22 as seen in FIG. 4, or by means of an electric motor drive as seen in FIGS. 4 and 7. The electric drive consists of a motor 177, which is connected through a shaft 178, seated fixed in place in the work carriage 22, and through a gear wheel 179 seated thereon, with the toothed rack 104 of the drive cross bar 47. If required, it is possible to dispose two additional intermediate gear wheels 181 and 182, seated fixed in place on the work carriage 22, between the gear wheel 179 and the toothed rack 104. The work carriage 22 is displaced, for example by means of the motor drive 177, 178, 179, 181 and 182, along the paper web supply roll 18 from a right position in the vicinity of the strut 12 over the entire paper web width "b" to the strut 8, as seen in FIG. 1. In the process, the initiator 171 fixed in place on the work carriage 22 initially comes into operative contact with the pin 173 fixed in place on the drive cross bar 47. The electromagnetic coupling 170 connects the two shafts 165 and 166, so that both cutters 147, 148 perform one revolution in a clockwise direction from their positions of rest. During this revolution, the left cutter 147 comes into contact with the paper web 20, in the area adjacent the right lateral web edge 34, as well as with a counter-cutting bar 183 which is made of an elastic material and which is located on the cutting cross bar 46. In the process, a cut 186 extending to the first lateral edge 34 is made from the axis-parallel start 53 of the paper web, so that a right corner web section 123 is cut off. The right cutter 148 turns outside of the paper web 20 and therefore does not make a cut in the web.

Following the above mentioned one revolution of the cutters 147, 148, the initiator 169 comes into operative contact with the pin 168 located on the pulley 167, so that the electromagnetic coupling 170 disconnects the two shafts 165, 166. The cutters 147, 148 have thus again reached their initial position. The initiator 171 subsequently comes into contact with the left pin 172 fixed in place on the drive cross bar in the course of the further movement of the work carriage 22 into its left end position. Because of this, the electromagnetic coupling 170 switches on the drive 164, so that now the right cutter 148 severs a left corner section 122 from the paper web 20 along a cut 184 that extends between the start 53 of the paper web and the left lateral edge 35. The left cutter 147 turns outside of the paper web 20. As previously described, the electromagnetic coupling 170 is again opened after one revolution, so that the cutters 147, 148 again are stopped in their initial position.

It is possible to employ equivalent mechanical switching elements in place of the initiators 169 and 171 in a manner analogous to the driver wheel 86 which is in contact with one or several drivers 88. In accordance with a second embodiment, it is also possible to make respectively one cut 184 or 186 in the paper web 20 in the vicinity of the lateral edges 34, 35 and only later to shape a start 53 of the paper web. It is furthermore also possible to provide an individual drive 146, which can be separately connected, respectively for each cutter 147 or 148 or for each cutter support 126 or 127. In accordance with another embodiment, it is possible to dispose a rotatable cutter 147 or 148, fixed in place on the frame, in the vicinity of each lateral edge 34 and 35. Each such cutter 147 or 148 can be provided with its own drive and can be designed so it can be tilted away from the frame 1, if necessary. In accordance with a further embodiment, a cutter 147 or a cutter support 126 is employed which is movable on the work carriage 22. This cutter 167 is disposed on the lower end 152 of its rotary shaft 128 so as to be pivotable around the universal joint 154 in the direction of the cut edge, either to be made or imagined, of a first or second corner section 122 or 123, and is driven in the manner previously described. In this way, this one cutter 147 can be pivoted into both angular positions which are required for making both lateral edge cuts 184 and 186 in sequence in the paper web 20. It is advantageous to make the cutting edge 149 or 151 of the cutter 147 or 148 serrated, in which case a height of the serrations of two to five millimeters is recommended. It is also advantageous to make the cutting edges 149 or 151 of the cutters 147 or 148 of a length "l", of, for example 60 millimeters. It is also possible to actuate the pivotable frame 39 by means of a drive, for example a cylinder-piston unit.

The operation of the work carriage 22, with its various previously described devices in the preparation or processing of a paper web leading edge will now be described. The work carriage frame 1 is brought into an appropriate preparation position in relation to the paper web supply roll 18. For example, frame 1 is displaced in the vertical direction, for example, on the rails 32 and 33 of the main carriage of the roll changer 31. The free end 50 of the paper web supply roll 18 is introduced between the rubber strips 51 and 52 of the upper cross bar 43 of the pivotable frame 39 and of the upper cross bar 16 of the work carriage frame 1, and is subsequently guided between the cutting cross bar 46 and the drive cross bar 47, so that the free end 50 of the paper web 20 covers at least the cutting groove 58 located in the counter-cutting bar 45. In the process, the paper web supply roll 18 is turned in the direction indicated by the arrow in FIG. 1. After clamping or holding the paper web 20 in place between the rubber strips 51 and 52 of the upper pivotable cross bar 43 and the cross bar 16 fixed in place on the frame 1, the work carriage 22 is displaced or pushed from the right position, outside of the width "b" of the paper web supply roll 18, into a left position, also outside of the width "b" of the paper web supply roll 18. In the course of this movement of the work carriage 22 transversely across the paper web supply roll 18, the following operating steps are performed:

Transverse cutting of the start 50 of the paper web 20 by means of the transverse cutting device 61, 62 along the cutting groove 58, so that a cut leading edge is created at 53;

Application of adhesive labels 67, spaced apart at a distance "c", by means of the adhesive label dispenser 66 fixed in place on the work carriage 22 in such a way that a first half 72 of each adhesive label 67 is respectively glued with its adhesive surface to the start 53 of the paper web, while the second half 73 of each adhesive label 67 projects past the start 53 of the paper web or the cut edge;

Application of two-sided adhesive tape 96, as the adhesive for gluing the connection together, in the vicinity of the cut start edge at 53 and with a lower edge 59 of the tape 96 spaced at a distance "d" from, and parallel or approximately parallel with cut edge 53 by means of the adhesive tape application device 93 fixed in place on the work carriage; and Severing of the web corners 122 and 123 on both sides between the start 53 of the paper web and the paper web lateral edges 34 and 35.

Following the release of the pivotable latch bars 48 and the pivoting away of the pivot frame 39, the cut start edge 53 of the paper web is wound back on the paper web supply roll 18 and in the process the lower halves 73 of the adhesive labels 67 are pressed on the second layer 21 of the paper web by means of a pressure roller 133. In the process, the paper web supply roll 18 is rotated so that the adhesive surface of the second halves 73 of the adhesive labels 67 rests on the second layer 21 of the paper web supply roll 18. It is also possible to apply the adhesive tape 96 extending parallel with the cut start edge 53 of the paper web 20 immediately after the application of the adhesive labels 67 or optionally, only after this further revolution of the paper web supply roll 18. Pressing on of the lower halves 73 of the adhesive splice labels 67 is performed by means of the pressure roller 133, which can be applied to the paper web supply roll 18 on both sides under the force of tension springs 137 and 138 secured to pivotable arms 134 and 136 which support the pressure roller 133, and to the guide rails 32 and 33 at the ends of the struts 7 and 11, facing away from the main carriage as shown in FIG. 1. The pressure roller 133 has a jacket of plastic with anti-adhesive properties, for example a jacket of silicon caoutchouc. Anti-adhesive properties are understood to be the property of the plastic which repels adhesive. It is also possible to employ a brush roller in place of a pressure roller 133, whose bristles consist of a plastic with anti-adhesive properties, so that here, too, adhesion by the roller 133 to the top of the two-sided adhesive tape 96 is prevented.

In accordance with a further embodiment, it is possible to dispose a second label dispenser 141 on the work carriage 22, as depicted schematically in FIG. 4, with this second label dispenser 141 having a mode of operation analogous to the first adhesive label dispenser 66. The second label dispenser 141 is disposed at the end of the work carriage 22 on the side of the corner cutting device 121 remote from the adhesive label dispenser 66. The second label dispenser 141 is used for dispensing reflective foil labels 139, for example as seen in FIG. 3. which are respectively applied once to the paper web 20 in the vicinity of the cut edge at 53. A label 139 of this type. applied to the start of the paper web 20. can be used in connection with a signal emitter. not shown. at the time of starting up a paper web roll 18. for the selection of the suitable time of connecting the paper web supply roll 18 with a paper web from a paper web supply roll which is about to run out. The foil label 139 can be disposed in the vicinity of a first lateral edge 34 of the paper web 20 as well as simultaneously in the vicinity of the upper part 72 of an adhesive label 67. In the process. the movement of the label dispenser 141 is triggered by the engagement of a pin analogous to the pin 87 of a driver wheel analogous to the driver wheel 86 in a groove 143 of a driver 142 located on the drive cross bar 47 analogous to the first adhesive label dispenser 66.

While a preferred embodiment of a paper web leading edge preparation device in accordance with the present invention has been set forth fully and completely hereinabove. it will be apparent to one of skill in the art that a number of changes in. for example. the overall size of the device. the type of printing press with which it will be used. the size of the paper web roll and the like could be made without departing from the true spirit and scope of the present invention which is accordingly to be limited only by the following claims.

What is claimed is:

1. A processing device usable to prepare a paper web supply roll having a paper web supply roll axis of rotation. a paper web leading edge. and spaced first and second lateral side edges for a paper web splice. said processing device comprising:

a work carriage;

means to support said work carriage adjacent said paper web leading edge and to clamp said paper web leading edge stationary;

means to shift said work carriage generally along said paper web leading edge between said first and second lateral side edges in a direction parallel to said paper web supply roll axis of rotation;

first and second elongated cylindrical paper web lateral edge cutter supports mounted on said work carriage for rotation about first and second paper web lateral edge cutter support axes of rotation. said axes of rotation being inclined at acute angles to said paper web leading edge;

first and second paper web lateral edge cutters each having an elongated cutting edge and being supported on said first and second elongated cylindrical paper web lateral edge cutter supports. said elongated cutting edges of said first and second paper web lateral edge cutters extending along said first and second elongated cylindrical paper web lateral edge cutter supports parallel to said first and second paper web lateral edge cutter support axes of rotation; and means to rotate said first and second paper web lateral edge cutter supports and said first and second paper web lateral edge cutters and to sever a first web corner section from said first lateral side edge of said web adjacent said paper web leading edge using said elongated cutting edge of said first paper lateral edge cutter when said work carriage is initially positioned adjacent said first lateral side edge of said paper web and is held stationary. and to sever a second web corner section from said second lateral side edge of said web adjacent said paper web leading edge using said elongated cutting edge of said second paper lateral edge cutter when said work carriage is subsequently positioned adjacent said second lateral side edge of said paper web and is held stationary. said first and second web corner sections being severed while said paper web leading edge is also held stationary by said means to clamp said paper web leading edge.

2. The processing device of claims 1 wherein said first and second rotatable paper web lateral edge cutter supports each extend at a first acute angle inside an extended X–Y plane in respect to the X axis of a spatially right-angled coordinate system X. Y. Z and extend at a second acute angle inside an extended X–Z plane in respect to the X-axis of said spatially right angled coordinate system X. Y. Z.

3. The processing device of claim 1 further including a paper web leading edge cutter on said work carriage for cutting said leading edge of said paper web along a horizontal line.

4. The processing device of claim 1 further including a separate cutter support drive for each of said first and second paper web lateral edge cutter supports.

5. The processing device of claim 1 further including a work carriage support frame supporting said work carriage adjacent said paper web leading edge.

6. The processing device of claim 1 further including a cutter support drive for both of said first and second paper web lateral edge cutter supports.

7. The processing device of claim 1 further including first and second adhesive label dispensers and an adhesive tape applicator disposed on said work carriage.

* * * * *